United States Patent [19]

Montgomery et al.

[11] Patent Number: 5,015,070
[45] Date of Patent: May 14, 1991

[54] REFERENCE GRID FOR OPTICAL SCANNER

[75] Inventors: James R. Montgomery, Menlo Park; Larry L. Mohr, Pleasanton, both of Calif.

[73] Assignee: Mouse Systems Corporation, Fremont, Calif.

[21] Appl. No.: 323,424

[22] Filed: Mar. 14, 1989

[51] Int. Cl.[5] .................. G02B 27/00; G01V 9/04
[52] U.S. Cl. ............................. 350/163; 250/221; 350/321
[58] Field of Search .............. 350/3.74, 3.83, 103, 350/107, 109–116, 172, 590, 1.5–1.7, 162.11–162.24, 163–167, 361–363, 319, 322, 6.7, 6.8; 250/221, 330; 372/23–31

[56] References Cited

U.S. PATENT DOCUMENTS

| | | | |
|---|---|---|---|
| 3,782,289 | 1/1974 | Wicker | 350/321 |
| 3,905,822 | 9/1975 | Marks | 350/322 |
| 4,022,947 | 5/1977 | Grubb et al. | 350/1.7 |
| 4,027,411 | 6/1977 | Foldessy | 40/106.1 |
| 4,158,136 | 6/1979 | Felix et al. | 250/330 |
| 4,179,181 | 12/1979 | Chang | 350/1.7 |
| 4,199,218 | 4/1980 | Steinhage et al. | 350/1.7 |
| 4,505,545 | 3/1985 | Salia-Munoz | 350/321 |
| 4,510,605 | 4/1985 | George et al. | 372/23 |
| 4,573,465 | 3/1986 | Sugiyama et al. | 128/303.1 |
| 4,599,798 | 7/1986 | Steele | 33/1 B |
| 4,637,027 | 1/1987 | Shirasaki et al. | 372/27 |
| 4,660,205 | 4/1987 | Harter et al. | 372/18 |
| 4,678,869 | 7/1987 | Kable | 178/19 |
| 4,705,590 | 11/1987 | Vandenberg | 156/447 |
| 4,710,426 | 12/1987 | Stephens | 350/1.7 |
| 4,751,706 | 6/1988 | Rohde et al. | 372/23 |
| 4,773,717 | 9/1988 | Pai et al. | 350/1.7 |
| 4,794,405 | 12/1988 | Kennedy, Jr. | 350/6.7 |
| 4,797,544 | 1/1989 | Montgomery et al. | 250/221 |
| 4,871,220 | 10/1989 | Kohin | 350/1.7 |

Primary Examiner—Bruce Y. Arnold
Assistant Examiner—Thong Nguyen
Attorney, Agent, or Firm—Thomas Schneck

[57] ABSTRACT

A wavelength-selective pad that is transparent when viewed by light of a first wavelength $\lambda_1$ (e.g., visible light) and is highly reflective when viewed by light of a second wavelength $\lambda_2$ (e.g., infrared light). The pad has a grid positioned above the highly reflecting layer so that this grid can be sensed by use of light of wavelength $\lambda_2$ while, simultaneously, images, graphics or text positioned below the pad may be read by use of light of wavelength $\lambda_1$. A text scanner system that produces and senses light at the two wavelengths is used in combination with the pad to simultaneously read the graphics or text and the grid position of the beam that illuminates the graphics and text.

45 Claims, 3 Drawing Sheets

REFERENCE GRID FOR OPTICAL SCANNER

DESCRIPTION

1. Technical Field

This invention relates to computer input devices and more particularly to a reference grid which cooperates with an optical scanner.

2. Background Art

CCD array text scanners, used as computer input devices, often rely on grids of lines that overlie or underlie the text to be scanned, in order to determine where to place, in a computer memory, each character or word that is scanned by the system. Ideally, the grid should be transparent to the viewer or operator of the scanner when the grid and the adjacent text are viewed by light at a visible wavelength $\lambda (0.4 \mu m < \lambda < 0.7 \mu m)$. However, if the text scanner simultaneously senses the number of grid lines crossed to determine the scanner's position on a gridded sheet, the scanner can become confused where both text and grid lines must be simultaneously sensed by the system.

Transparent grid sheets or cards are popular where the human operator or viewer scans the text and simultaneously takes note of the underlying or overlying grid; the operator or viewer can often easily distinguish between text and grid lines. U.S. Pat. No. 4,027,411, issued to Foldessy for a microfiche marking system, discloses a system that uses a coded transparent grid card positioned beneath a microfiche in an illuminated viewing panel that is arranged so that the frame numbers of the fiche are visible through the fiche. This system may be used to indicate the presence of updated or deleted information by use of translucent ink on certain coordinate squares of the fiche.

Felix et al. disclose a camera system employing the pyroelectric effect for detection of infrared radiation in U.S. Pat. No. 4,158,136. A fixed object is viewed by time-modulated radiation that is produced by a partly transparent grid; the grid moves transversely between the object and the radiation detector.

Steele, in U.S. Pat. No. 4,599,798, discloses a layout device for word processors that uses a transparent grid sheet that overlies or underlies a work sheet on which characters may be entered. In practice, a viewer reads a transparent grid locator sheet and determines the cursor positions that locate the material that is to be keyed into the word processor.

A position-responsive apparatus that employs two orthogonally-oriented arrays of grid elements on a transparent grid sheet is disclosed by Kable in U.S. Pat. No. 4,678,869. The elements of each array are coupled by resistors along a border of a viewing screen, which underlies the grid sheet. The two grid arrays are capacitively coupled at the crossover positions of the grid elements, and the capacitive coupling is reduced by reducing the widths of the grid lines at the crossover positions. The position of a scanner or other viewing module relative to the grid arrays on the viewing screen is determined electrographically using resistance differences rather than being determined by visual means.

A machine for adhesively mounting a printing plate on a plate roller is disclosed by Vandenburg in U.S. Pat. No. 4,705,590. A transparent grid plate is mounted to be rotated into place overlying the printing plate to properly align the plate with the plate roll. No text or characters are intended to be read or sensed directly using this invention.

In each of the above inventions, light at a single wavelength (visible or infrared) is used together with a transparent grid sheet or plate to allow plate alignment or determination of position of a scanner or text/graphics-sensing module relative to the grid. Use of the same light to scan text or graphics that lie below the grid sheet and to determine scanner position on the grid sheet may confuse the scanner by simultaneously presenting both grid lines and characters to the sensors of the scanner.

An object of the invention is to provide a scanner pad that reduces the likelihood of confusion of the scanner module when the module simultaneously senses both characters to be read and a grid used for purposes of position determination.

SUMMARY OF THE INVENTION

The object of the invention is met by a scanner pad or reference grid or sheet that is transparent when illuminated by light at a first wavelength $\lambda_1$, such as in the visible spectrum, so that a scanner sensor sensing light at $\lambda_1$ and positioned on the pad can unambiguously read the image, text or graphics that are located below the pad. When the sheet is illuminated with light of a second wavelength, such as an infrared wavelength, one layer of the sheet becomes highly reflective so that a scanner sensor operating at this second wavelength only senses the presence of a grid that is positioned between the highly reflecting surface and the scanner sensor. Using such a pad, the viewer or operator can use his or her eyesight to direct a first scanner sensor to read the text or graphics on a screen or sheet that underlies the scanner pad; and a second scanner sensor, operating at a different wavelength for illumination, can sense the grid lines. The positions associated with text or graphics are read by the first scanner sensor, without confusion with the grid lines.

In one embodiment, the scanner pad comprises two or more layers, with one such layer being provided with grid lines thereon that are absorptive when viewed at a second wavelength $\lambda \approx \lambda_2$. This grid line layer of the pad includes a multilayer coating that is transparent when viewed by light at wavelength $\lambda \approx \lambda_1$ and is substantially fully reflecting when viewed by light at wavelength $\lambda \approx \lambda_2$. The pad is optionally covered at the top surface thereof with a protective coating of material that is transparent when viewed by light at wavelength $\lambda_1$ and at wavelength $\lambda_2$ and that protects the underlying layers of the pad from abrasion and other consequences of use of a scanning device in contact with the upper surface of the pad. A base layer of plastic material or glass that is transparent at wavelength $\lambda_1$ is included to provide structural strength for the scanner pad.

In another embodiment of the invention, the scanner pad is used as part of a system that provides one or more radiation sources for the two wavelengths $\lambda_1$ and $\lambda_2$ and provides one or more radiation detectors for light at these wavelengths.

BEST MODE FOR CARRYING OUT THE INVENTION

Figure 1A:
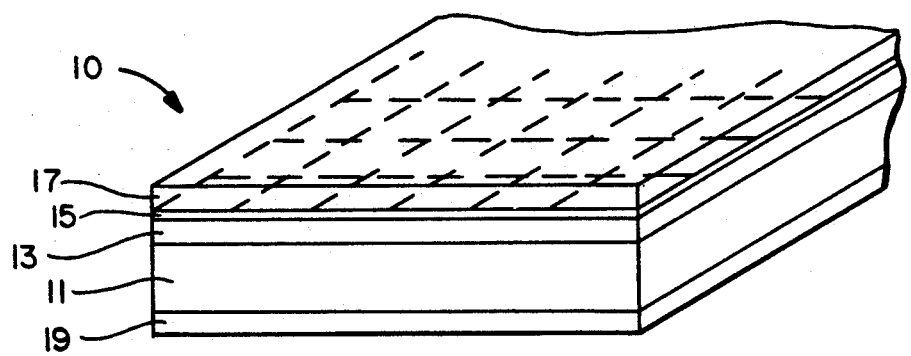
FIGS. 1A, 1B and 1C are cross-sectional side views of the scanner pad according to three embodiments of the invention.

With reference to FIG. 1A, the scanner pad apparatus 10 in one embodiment is a pad consisting of four or more layers of material, all of which are substantially transparent when viewed by light at a first wavelength $\lambda_1$, which may be advantageously chosen to be a wavelength in the visible range. A first layer 11 of the apparatus 10 is polyester or similar plastic material and has a thickness of 2-10 mils, or even greater thickness if additional strength is desired. Alternatively, the first layer 11 may be a thin plate of glass of thickness of the order of 1 mm or greater. For convenient reference, the apparatus 10 will be referred to herein as a "pad" or "scanner pad" whether the layer 11 is plastic or glass, and the layer 11 will be referred to as a base layer. Each of the layers or sheets described herein has two substantially parallel faces, with at least one such face being contiguous to another layer that is also part of the pad 10. The base layer 11 provides strength and some bulk for the pad 10.

A multilayer optical coating 13 is positioned contiguous to one face of the base layer 11 and provides a layer that is transparent when viewed by light at the first wavelength $\lambda_1$, and is highly reflecting when viewed by light at a second wavelength $\lambda_2$ that may be infrared radiation of wavelength $\lambda_2 > 0.7 \mu m$. The optical coating 13 may include a sequence of layers of alternating high refractive index (for example, $n \geq 2.3$) and low refractive index material (for example, $n \leq 1.9$) on light at the second wavelength $\lambda_2$, with each of these layers having a thickness approximately equal to $\lambda_2/4$. The optical coating 13 is arranged so that light that is of wavelength $\lambda_2$ and is incident on this coating will be substantially fully reflected while light of wavelength $\lambda_1$ that is incident on the film will be at least partly transmitted by this coating. The optical coating 13 will be said to be substantially fully reflecting herein if light at the wavelength of interest is at least 40 percent reflected by the coating 13.

One example of such a multilayer coating 13 is Altair M-5, M-10 and M-20 sheets, having visible light transmission of 62, 80 and 84 percent, respectively, available from Southwall Technologies of Palo Alto, Calif. Another example is Intrex G, available from Sierracin, Los Angeles, Calif. The optical coating 13 lies between a layer containing grid lines and the base layer 11. An example of a pair of alternating layers is indium oxide ($InO_2$) with $n=1.86$ and $Ag_xAu_y$ with $n=3.41$ at infrared wavelengths, used in alternating layers in a well known manner. Other examples of suitable low and high index coatings are $CaF_2$ ($n=1.22$), LiF ($n=1.29$), $MgF_2$ ($n=1.38$), $3NaF.AlF_3$ ($n=1.35$), ZnS ($n=2.3$), CdS ($n=2.26-2.5$), $TiO_2$ ($n=2.4-2.6$), $Sb_2S_3$ ($n=2.8-3.0$) and Si ($n=3.4-3.5$).

Figure 1B:
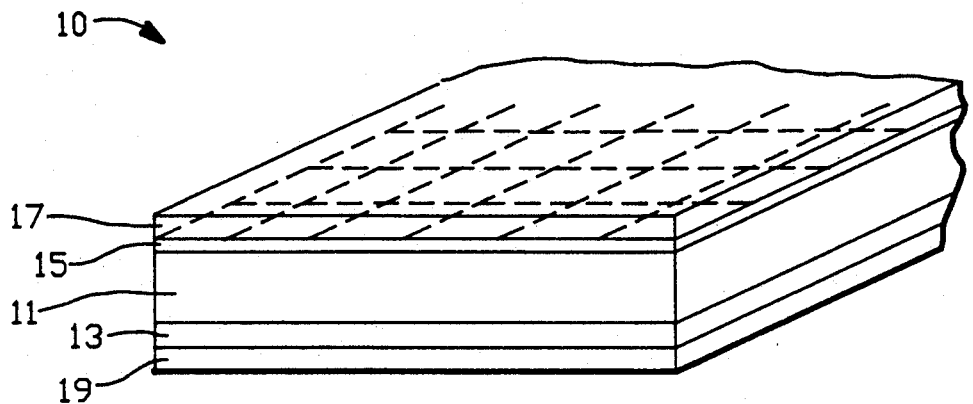
Figure 1C:
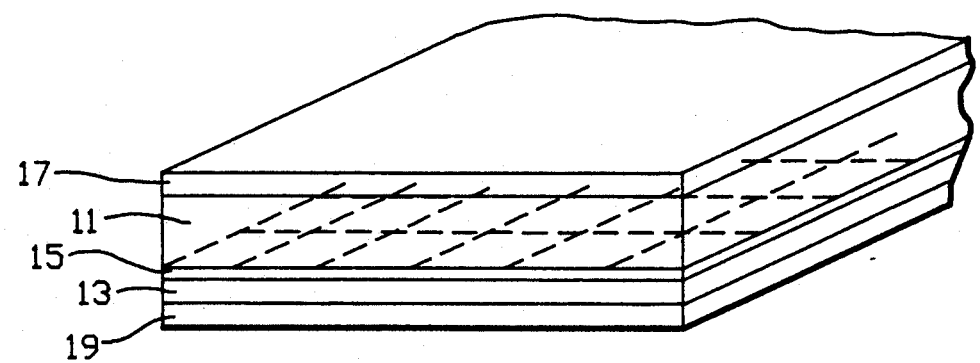

A grid 15 is printed on the remaining face of the multilayer coating 13 and contains an array of grid lines. The grid lines that comprise the grid 15 may be, but need not be, transparent when viewed by light at wavelength $\lambda_1$ and are at least partly absorbing when viewed by light at wavelength $\lambda_2$. The grid 15 of lines may contain a dye such as a dye that is absorbing at the wavelength $\lambda_2$. Suitable dyes include IR-99, IRA-850, IRA-870 and IRA-897, available from Exciton Chemical Co., Dayton, Ohio; and Hexacymin 3, available from Lambda Physik, West Germany. Although FIG. 1 illustrates an embodiment with the optical coating 13 lying between the base layer 11 below and the grid 15 above, two other configurations are: (1) base layer 11 lying between the optical coating 13 below and the grid 15 above (FIG. 1B) and (2) grid 15 lying between the optical coating 13 below and the base layer 11 above (FIG. 1C). The grid 15 should lie between the optical coating 13 and any light source used with the pad 10.

A third layer 17 (optional) of the pad is a protective coating of material that is transparent when viewed by light at wavelength $\lambda_1$ and at wavelength $\lambda_2$ and is positioned on the remaining face of the grid 15 so that the grid 15 lies between the protective coating 17 and the optical coating 13 that are part of the pad 10. The protective coating 17 may be an acrylic or similar material that provides protection against abrasion and other consequences of friction that develop between the pad and a scanning module that rests on and is in contact with the upper surface of the pad. Use of the protective coating 17 is not required but may increase the life of the remainder of the pad 10.

Optionally, a second protective coating 19 may be provided that is contiguous to the remaining face of the base sheet 11 so that the base sheet 11 lies between the optical coating 13 and the second protective coating 19. The second protective coating 19 may be of the same material as the first protective coating 17, may have a similar thickness, and is also optional.

Figure 2:
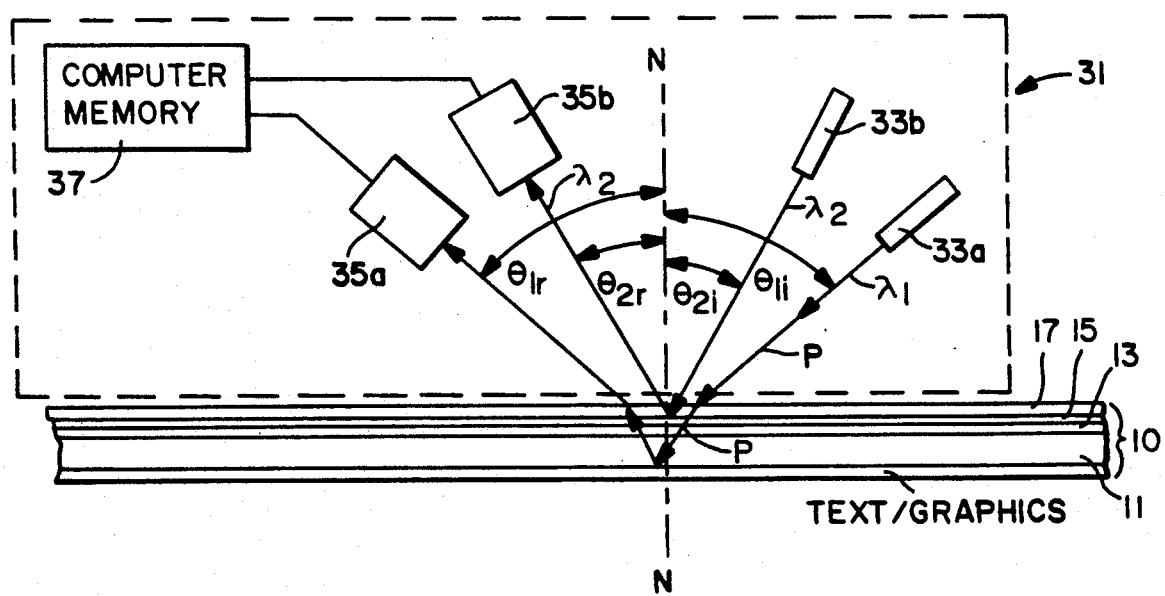
FIG. 2 is a schematic view of a two-wavelength scanner operating in combination with the invention in FIG. 1.

FIG. 2 illustrates an appropriate use of the pad 10 with a scanner module 31, for scanning text or graphics on a sheet that is positioned beneath the pad 10. The scanner module 31 preferably has two sources of radiation 33a and 33b of different wavelength ranges positioned to direct radiation of representative wavelengths $\lambda_1$ and $\lambda_2$, respectively, toward the exposed surface of the pad 10 at non-zero incidence angles $\theta_{1i}$ and $\theta_{2i}$, respectively. The source 33a, which produces visible wavelength radiation with wavelength $\lambda_l$, may be conveniently positioned at an incidence angle such as $\theta_{1i} \approx 40°$. A radiation detector 35a that is sensitive only in a range that includes wavelength $\lambda_1$ may be positioned as shown in FIG. 2 to receive, by reflected light, information displayed by the radiation beam of wavelength $\lambda_1$ from a layer of text or graphics that lies below the pad 10, as illustrated in FIG. 2. The reflection angle $\theta_{1r}$ associated with the radiation detector 35a may be, but need not be, equal to the incidence angle $\theta_{1i}$ for that radiation beam; the radiation detector 35a may be positioned with a reflection angle $\theta_{1r} \approx 0$ in order to more conveniently read the text or graphics that lie below the path P of the beam, provide optimum contrast, and reduce parallax problems.

A second radiation detector 35b is positioned to receive the reflected radiation of wavelength $\lambda_2$ produced by the source 33b, with an incidence angle $\theta_{2i}$ and an associated reflection angle $\theta_{2r}$, and preferably $\theta_{2r} = \theta_{2i} \approx 30°$ for the beam of wavelength $\lambda_2$. The radiation detector 35a will read the text and graphics positioned below the pad 10, and the radiation detector 35b will sense the grid lines that are a part of the grid 15 of the pad 10. Operating in this manner, the pad 10 allows the two radiation source/detector combinations 33a/35a and 33b/35b to independently read text/graphics and grid lines so that the two detectors do not interfere with one another.

The first radiation source 33a may produce a broad band of radiation, for example white light or a band that includes the wavelength $\lambda_2$ as well as the wavelength $\lambda_1$, or may provide only a narrow band that includes the wavelength $\lambda_1$ but not the wavelength $\lambda_2$. The second radiation detector 35b should be suitably baffled or should be provided with a suitable optical filter so that light from the first radiation source 33a does not reach the photosensitive portion of the second detector 35b. Similarly, the first detector 35a should not receive any light from the second radiation source 33b.

The base layer 11 of the pad 10 in FIGS. 1 or 2 may, optionally, be provided with a dye that absorbs substantially all radiation except radiation of wavelength approximately equal to $\lambda_1$, which is transmitted. Because the radiation produced by the first radiation source 33a must pass through the base layer 11 twice before its receipt by the first radiation detector 35a, the presence of this dye in the base layer 11 produces a sharpened filtering out of radiation of wavelengths that are not approximately equal to $\lambda_1$.

The text/graphics read by the first radiation detector 35a are stored in a computer memory 37 for subsequent use. The location(s) in computer memory 37 for storage of the text/graphics presently being read is controlled by the position on the grid 15 that is presently sensed by the second radiation detector 35b. An example of how this may be done using a pair of detectors, spaced apart, is disclosed in a related U.S. Pat. No. 4,797,544, issued to Montgomery on 10 Jan. 1989 and licensed to the same assignee.

Figure 3:
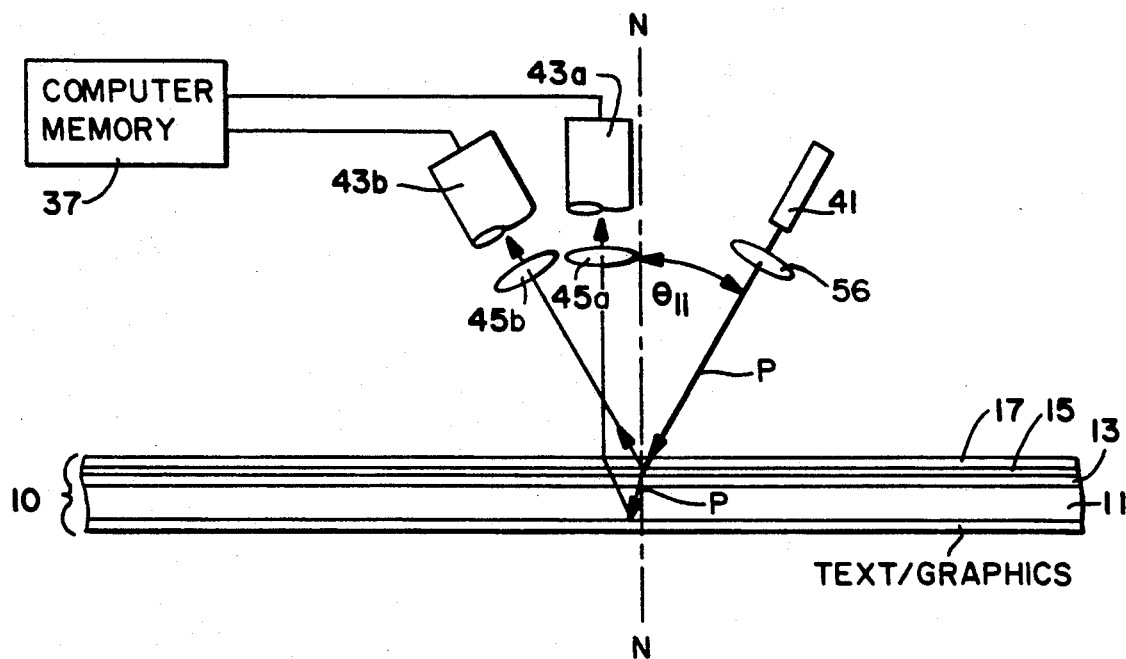
FIGS. 3 and 4 are schematic views of other two-wavelength scanner operating in combination with the invention in FIG. 1.

Another alternative to the system shown in FIG. 2 is to use a single light source 41, illustrated in FIG. 3, that produces light of characteristic wavelengths $\lambda_1$ and $\lambda_2$ substantially simultaneously. A first detector 43a may be positioned to receive part of the reflected light with a small reflection angle $\theta_{1r} \approx 0°$, and a second detector 43b may be positioned to receive part of the reflected light at reflection angle $\theta_{2r} = \theta_{2i} \approx 30°$. The first and second detectors 43a and 43b are sensitive to light at or around the respective wavelengths, respectively $\lambda_1$ and $\lambda_2$, respectively. Optionally, the detectors 43a and 43b may be provided with radiation filters 45a and 45b, respectively, positioned between the scanner pad 10 and the detectors 43a and 43b, that screen out light of wavelengths near $\lambda = \lambda_2$ and $\lambda = \lambda_1$, respectively, so that only light of wavelengths $\lambda \approx \lambda_1$ and $\lambda \approx \lambda_2$, respectively, reaches the photosensitive portions of the detectors 43a and 43b. As noted above, optionally the base layer 11 may include a wavelength-selective dye that transmits light of wavelength approximately equal to $\lambda_1$.

Another alternative is to replace the light source 41 that produces light of characteristic wavelengths $\lambda_1$ and $\lambda_2$ substantially simultaneously by a single light source 41 that produces light of characteristic wavelengths $\lambda_1$ and $\lambda_2$ alternatingly in a rapidly changing sequence, with the same arrangement of light source 41, detectors 43a and 43b, and optional filters 45a and 45b as shown in FIG. 3. The filters 45a and 45b may also be provided for the detectors 35a and 35b in FIG. 2. An example of a light source that is capable of alternatingly producing light of two different wavelengths is the dual frequency optical cavity disclosed by George et al. in U.S. Pat. No. 4,510,605, which is incorporated by reference herein. Other examples of apparatus that produces radiation of two or more wavelengths in an alternating manner are disclosed in U.S. Pat. No. 4,573,465, issued to Sugiyama et al., U.S. Pat. No. 4,637,027, issued to Shirasaki et al., U.S. Pat. No. 4,660,205, issued to Harter et al., U.S. Pat. No. 4,747,110, issued to Takahashi et al., and U.S. Pat. No. 4,751,706, issued to Rohde et al. Many techniques are available for production of light at two spaced apart wavelengths by a single source.

Figure 4:
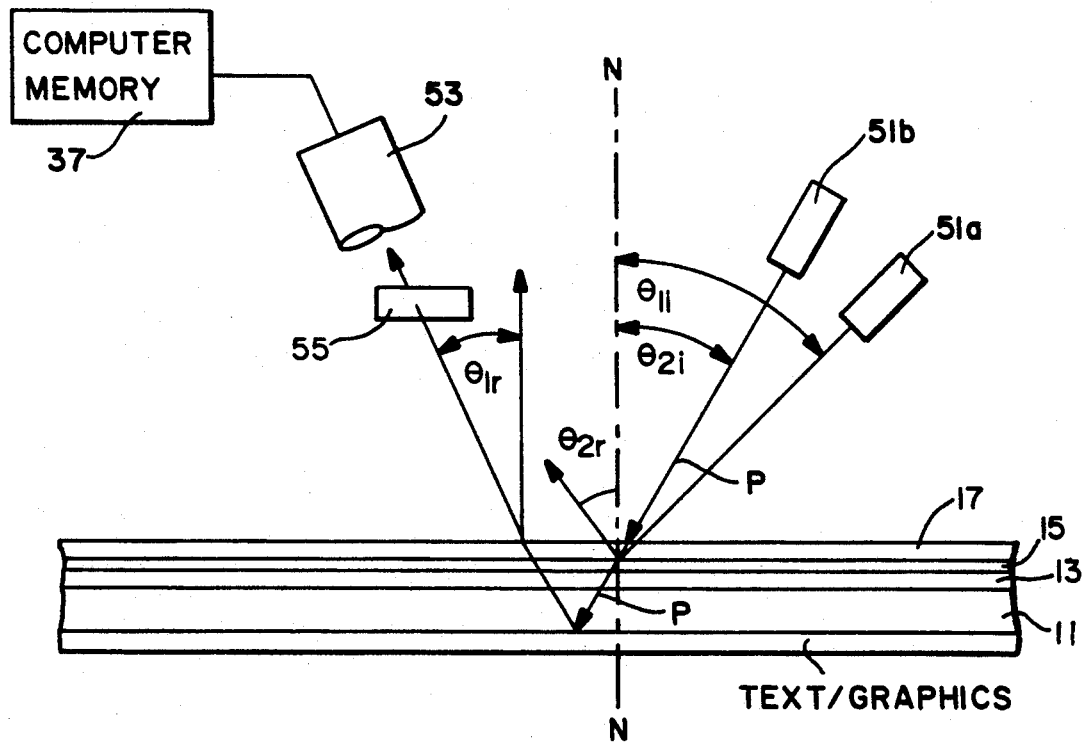

In another embodiment of the invention, the two detectors 35a and 35b in FIG. 2 may be replaced by a single detector 53 positioned at a reflection angle $\theta_{2r} = \theta_{2i}$, to receive reflected radiation of wavelengths $\lambda_1$ and $\lambda_2$ from two light sources 51a and 51b, where the detector 53 alternatingly or simultaneously detects incident radiation that has wavelength $\lambda \approx \lambda_1$ and $\lambda \approx \lambda_2$, as illustrated in FIG. 4. The detector 53 may be provided with a filter means 55 (optional), positioned between the scanner pad 10 and the detector 53 or within the detector 53, to suppress or divert light, whose wave-length is not approximately equal to $\lambda_1$ or $\lambda_2$. The filter, means 55 may be: (1) a double bandpass filter that suppresses or absorbs all light except for light having a wavelength component $\lambda \approx \lambda_1$, or having a wavelength component $\lambda \approx \lambda_2$, or both; or (2) a light beam diversion module that alternatingly directs light of wavelength $\lambda_1$ along a first path at a first sequence of times $\{t_i\}$ and directs light of wavelength $\lambda_2$ along a second path at a second sequence of times $\{t_i'\}$ with $t_1 < t_1' < t_2 < t_2' < \ldots$; or (3) a combination of (1) and (2). A double band pass filter (optional) 56 may also be positioned between the single radiation source 41 and the scanner pad 10 in the embodiment shown in FIG. 3.

In another embodiment of the invention, a single radiation source that produces radiation of wavelengths $\lambda_1$ and $\lambda_2$, and a radiation detector that detects incident radiation of wavelength $\lambda_1$ and incident radiation of wavelength $\lambda_2$, may be used together with the pad 10 shown in FIG. 2.

In the preceding discussion, the text/graphics sheet may be any information-bearing surface that can be read by an optical scanner, such as information appearing on a surface of a solid body.

We claim:

1. A wavelength-selective gridded pad that is at least partly transparent when viewed by light at a first wavelength $\lambda_1$ in the visible range and is highly reflective when viewed by light produced by a light source at a second wavelength $\lambda_2$, the pad comprising:
   a layer of optical coating that is at least partly transparent when viewed by light at wavelength $\lambda_1$ and is substantially fully reflective when viewed by light at wavelength $\lambda_2$;
   a grid of lines, positioned between the light source and the optical coating, where the grid lines are visible when viewed by light at wavelength $\lambda_2$; and
   a base layer of plastic or glass material, positioned adjacent to at least one of the grid of lines and the optical coating, that is transparent when viewed by light at wavelength $\lambda_1$.

2. A pad according to claim 1, further comprising a protective coating of material that is transparent when viewed by light at said wavelength $\lambda_1$ and at said wavelength $\lambda_2$, positioned adjacent to said grid of lines so that said grid of lines lies between the protective coating and said optical coating.

3. A pad according to claim 1, further comprising a protective coating of material that is transparent when viewed by light at said wavelength $\lambda_1$, positioned adjacent to said grid of lines so that said grid of lines lies between the protective coating and said optical coating.

4. A pad according to claim 1, wherein said optical coating comprises a first sequence of layers of a first material that is transparent to light of said first wavelength $\lambda_1$ and has a relatively high refractive index $n \geq 2.3$ alternating with a second sequence of contiguous layers of a second material that is transparent to light of said first wavelength and has a relatively low refractive index $n \leq 1.9$, where each layer from the first sequence and each layer from the second sequence has a thickness of approximately $\lambda_2/4$.

5. A pad according to claim 4, wherein said first material is drawn from the class of high refractive index materials consisting of $Ag_xAu_y$, ZnS, CdS, $TiO_2$, $Sb_2S_3$ and Si and said second material is drawn from the class of low refractive index materials consisting of indium oxide, $CaF_2$, LiF, $MgF_2$ and $3NaF \cdot AlF_3$.

6. A pad according to claim 1, wherein said first wavelength $\lambda_1$ lies in the wavelength range $0.4 \ \mu m < \lambda < 0.7 \ \mu m$ and second wavelength $\lambda_2$ lies in the wavelength range $\lambda > 0.7 \ \mu m$.

7. A pad according to claim 1, wherein said base layer contains a dye that absorbs or suppresses transmission of light of a wavelength that is not approximately equal to said wavelength $\lambda_1$.

8. A pad according to claim 1, wherein said grid of lines is substantially not visible when viewed by light at said first wavelength $\lambda_1$.

9. A pad according to claim 1, wherein said optical coating is positioned between said base layer and said source of light of said wavelength $\lambda_2$.

10. A pad according to claim 1, wherein said base layer is positioned between said optical coating and said grid of lines.

11. A pad according to claim 1, wherein said base layer is positioned between said grid of lines and said source of light of said wavelength $\lambda_2$.

12. An optical scanner system for reading images, text or characters positioned on a text/graphics sheet, the system comprising:
 a scanner pad that is positioned adjacent to the text/graphics sheet, that is at least partly transparent when viewed by light at a first wavelength $\lambda_1$ in the visible range, and that is highly reflective when viewed by light produced by a light source of a second wavelength $\lambda_2$, the pad comprising:
 a layer of optical coating that is at least partly transparent when viewed by light at wavelength $\lambda_1$ and is substantially fully reflective when viewed by light at wavelength $\lambda_2$;
 a grid of lines, positioned between the light source and the optical coating, where the grid lines are visible when viewed by light at wavelength $\lambda_2$;
 a base layer of plastic or glass material, positioned adjacent to at least one of the grid of lines and the optical coating, that is transparent when viewed by light at wavelength $\lambda_1$, the thickness of this layer being at least two mils; and
 memory means for storing text or graphics that are read from the text/graphics sheet;
 a first radiation source of light of wavelength $\lambda_1$, positioned above the scanner pad to produce and direct a small first beam of light of wavelength $\lambda_1$ along an incident light beam path through the scanner pad to the text/graphics sheet;
 first radiation detector means for receiving light from the first radiation source that is reflected from the text/graphics sheet and for sensing and storing in the memory means the text or graphics that are illuminated by the first beam of light.
 a second radiation source of light of wavelength $\lambda_2$, positioned above the scanner pad to produce and direct a small second beam of light of wavelength $\lambda_2$ toward, and illuminate a portion of, the grid of lines; and
 second radiation detector means for receiving light from the second radiation source that is reflected from the optical coating and for sensing the position of the portion of the grid of lines that is illuminated by the second beam of light, where the portion of the grid lines that are illuminated by the second light beam controls the locations in the memory means used for storage of the text or graphics on the text/graphics sheet that are presently being read by the first radiation detector means.

13. A system according to claim 12, further comprising a radiation filter, positioned between said scanner pad and said first radiation detector means, that at least partly transmits light of said wavelength $\lambda_1$ and that transmits substantially no light of said wavelength $\lambda_2$.

14. A system according to claim 13, wherein said radiation filter receives and diverts a beam of light from the incident light beam path if the light beam radiation has predetermined wavelength that is approximately one of said wavelength $\lambda_1$ or said wavelength $\lambda_2$.

15. A system according to claim 12, further comprising a radiation filter, positioned between said scanner pad and said second radiation detector means, that at least partly transmits light of said wavelength $\lambda_2$ and that transmits substantially no light of said wavelength $\lambda_1$.

16. A system according to claim 15, wherein said radiation filter receives and diverts a beam of light from the incident light beam path if the light beam radiation in the light beam has a predetermined wavelength that is approximately one of said wavelength $\lambda_1$ or said wavelength $\lambda_2$.

17. A system according to claim 12, further comprising an optical filter, positioned along the incident light beam path from at least one of said radiation sources to at least one of said radiation detector means, that at least partly transmits light at said wavelength $\lambda_1$ and to light at said wavelength $\lambda_2$ and that transmits substantially no light of a wavelength that is not approximately equal to $\lambda_1$ or to $\lambda_2$.

18. A pad according to claim 12, wherein said optical coating is positioned between said base layer and said source of light of said wavelength $\lambda_2$.

19. A pad according to claim 12, wherein said base layer is positioned between said optical coating and said grid of lines.

20. A pad according to claim 12, wherein said base layer is positioned between said grid of lines and said source of light of said wavelength $\lambda_2$.

21. An optical scanner system for reading images, text or characters positioned on a text/graphics sheet, the system comprising:
 a scanner pad that is positioned adjacent to the text/graphics sheet, that is at least partly transparent when viewed by light at a first wavelength $\lambda_1$ in the visible range, and that is highly reflective when viewed by light produced by a light source of a second wavelength $\lambda_2$, the pad comprising:
 a layer of optical coating that is at least partly transparent when viewed by light at wavelength $\lambda_1$ and is substantially fully reflective when viewed by light at wavelength $\lambda_2$;

a grid of lines, positioned between the light source and the optical coating, where the grid lines are visible when viewed by light at wavelength $\lambda_2$; and a base layer of plastic or glass material, positioned adjacent to at least one of the grid of lines and the optical coating, that is transparent when viewed by light at wavelength $\lambda_1$, the thickness of this layer being at least two mils;

memory means for storing text or graphics that are read from the text/graphics sheet;

a radiation source capable of producing a small light beam having a wavelength component of $\lambda_1$ and a light beam having a wavelength component $\lambda_2$, positioned above the scanner pad to produce and direct a beam of light, alternatingly having a component of wavelength $\lambda_1$ and having a component of wavelength $\lambda_2$, along an incident light beam path toward the scanner pad, with the scanner pad being positioned between the radiation source and the text/graphics sheet, where the beam of light having a wavelength component $\lambda_2$ illuminates only a portion of the grid of lines;

first radiation detector means for receiving light of wavelength $\lambda_1$ from the radiation source after reflection of such radiation from the text/graphics sheet, where the beam of light having a wavelength component $\lambda_2$ illuminates only a portion of the grid of lines;

first radiation detector means for receiving light of wavelength $\lambda_2$ from the radiation source after reflection of such radiation from the optical coating, and for sensing the position of the portion of the grid of lines that is illuminated by the beam of light, where the portion of the grid lines that is illuminated by the light beam controls the locations in the memory means used for storage of the text or graphics on the text/graphics sheet that are presently being read by the first radiation detector means.

22. A system according to claim 21, further comprising a radiation filter, positioned between said scanner pad and said first radiation detector means, that at least partly transmits light of said wavelength $\lambda_1$ and that transmits substantially no light of said wavelength $\lambda_2$.

23. A system according to claim 22, wherein said radiation filter receives and diverts a beam of light from the incident light beam path if the light beam radiation has a predetermined wavelength that is approximately one of said wavelength $\lambda_1$ or said wavelength $\lambda_2$.

24. A system according to claim 21, further comprising a radiation filter, positioned between said scanner pad and said second radiation detector means, that at least partly transmits light of said wavelength $\lambda_2$ and that transmits substantially no light of said wavelength $\lambda_1$.

25. A system according to claim 24, wherein said radiation filter receives and diverts a beam of light from the incident light beam path if the light beam radiation has a predetermined wavelength that is approximately one of said wavelength $\lambda_1$ or said wavelength $\lambda_2$.

26. A system according to claim 21, wherein said radiation source produces a light beam that substantially simultaneously has a wavelength component with said wavelength $\lambda_1$ and has a wavelength component with said wavelength $\lambda_2$.

27. A system according to claim 21 further comprising an optical filter, positioned along the incident light beam path from said radiation source to at least one of said radiation detector means, that at least partly transmits light at said wavelength $\lambda_1$ and to light at said wavelength $\lambda_2$ and that transmits substantially no light of a wavelength that is not approximately equal to $\lambda_1$ or to $\lambda_2$.

28. A pad according to claim 21, wherein said optical coating is positioned between said base layer and said radiation source.

29. A pad according to claim 21, wherein said base layer is positioned between said optical coating and said grid of lines.

30. A pad according to claim 21, wherein said base layer is positioned between said grid of lines and said radiation source.

31. An optical scanner system for reading images, text or characters positioned on a text/graphics sheet, the system comprising:

a scanner pad that is positioned adjacent to the text/graphics sheet, that is at least partly transparent when viewed by light at a first wavelength $\lambda_1$ in the visible range, and that is highly reflective when viewed by light produced by a light source of a second wavelength $\lambda_2$, the pad comprising:

a layer of optical coating that is at least partly transparent when viewed by light at wavelength $\lambda_1$ and is substantially fully reflective when viewed by light at wavelength $\lambda_2$;

a grid of lines, positioned between the light source and the optical coating, where the grid lines are visible when viewed by light at wavelength $\lambda_2$; and a base layer of plastic or glass material, positioned adjacent to at least one of the grid of lines and the optical coating, that is transparent when viewed by light at wavelength $\lambda_1$, the thickness of this layer being at least two mils;

memory means for storing text or graphics that are read from the text/graphics sheet;

a first radiation source that produces a small light beam having a wavelength component of $\lambda_1$, positioned above the scanner pad to produce and direct a small first beam of light of wavelength $\lambda_1$ along an incident light beam path through the pad to the text/graphics sheet;

a second radiation source that produces a small light beam having a wavelength component $\lambda_2$, positioned above the scanner pad to produce and direct a small second beam of light of wavelength $\lambda_2$ to illuminate a portion of the grid of lines; and radiation detector means for receiving light of wavelength $\lambda_1$ from the first radiation source after reflection of such light from said text/graphics sheet, for sensing and storing in the memory means the text or graphics that are illuminated by the first beam of light at a first sequence of times, for receiving light of wavelength $\lambda_2$ from the second radiation source after reflection of such light from said optical coating, and for sensing the position of the portion of the grid of lines that is illuminated by the second beam of light at a second sequence of times, where the grid lines that are illuminated by the beam of light of wavelength $\lambda_2$ control the locations in the memory means used for storage of the text or graphics on the text/graphics sheet that are presently being read by the first radiation detector means, and where the times in the first sequence and the times in the second sequence alternate with one another.

32. A system according to claim 31, wherein said radiation detector means includes light beam diversion means for receiving said first and second light beams, for directing an incoming beam of light of said wavelength $\lambda_1$ along a first path at each of said first sequence of times, and for directing an incoming beam of light of said wavelength $\lambda_2$ along a second path at each of said second sequence of times.

33. A system according to claim 31, further comprising an optical filter, positioned between said scanner pad and said radiation detector means, that is at least partly transparent to light of said wavelength $\lambda_1$ and to light of said wavelength $\lambda_2$ and that transmits substantially no light of a wavelength that is not approximately equal to $\lambda_1$ or to $\lambda_2$.

34. A pad according to claim 31, wherein said optical coating is positioned between said base layer and said source of light of said wavelength $\lambda_2$.

35. A pad according to claim 31, wherein said base layer is positioned between said optical coating and said grid of lines.

36. A pad according to claim 31, wherein said base layer is positioned between said grid of lines and said source of light of said wavelength $\lambda_2$.

37. An optical scanner system for reading images, text or characters positioned on a text/graphics sheet, the system comprising:
  a scanner pad that is positioned adjacent to the text/graphics sheet, that is at least partly transparent when viewed by light at a first wavelength $\lambda_1$ in the visible range, and that is highly reflective when viewed by light produced by a light source of a second wavelength $\lambda_2$, the pad comprising:
  a layer of optical coating that is at least partly transparent when viewed by light at wavelength $\lambda_1$ and is substantially fully reflective when viewed by light at wavelength $\lambda_2$.
  a grid of lines, positioned between the light source and the optical coating, where the grid lines are visible when viewed by light at wavelength $\lambda_2$; and
  a base layer of plastic or glass material, positioned adjacent to at least one of the grid of lines and the optical coating, that is transparent when viewed by light at wavelength $\lambda_1$, the thickness of this layer being at least two mils;
  memory means for storing text or graphics that are read from the text/graphics sheet:
  a radiation source capable of producing a light beam having a wavelength component $\lambda_1$ and a light beam having a wavelength component of $\lambda_2$, positioned above the scanner pad to produce and direct a small beam of light, alternatingly having a wavelength component of $\lambda_1$ and having a wavelength component of $\lambda_2$, along an incident light beam path toward the scanner pad, which is positioned between the radiation source and the text/graphics sheet, where the beam of light having a wavelength component $\lambda_2$ illuminates only a portion of the grid of lines; and
  radiation detector means for receiving light of wavelength $\lambda_1$ from the radiation source after reflection of such light from said text/graphics sheet, for sensing and storing in the memory means the text or graphics that are illuminated by the beam of light at a first sequence of times, for receiving light of wavelength $\lambda_2$ from the radiation source after reflection of such light from the optical coating, and for sensing the position of the portion of the grid of lines that is illuminated by the beam of light at a second sequence of times, where the portion of the grid lines that is illuminated by the beam of light of wavelength $\lambda_2$ controls the locations in the memory means used for storage of the text or graphics on the text/graphics sheet that are presently being read by the radiation detector means, and where the times in the first sequence and the times in the second sequence alternate with one another.

38. A system according to claim 37, further comprising a radiation filter, positioned between said scanner pad and said first radiation detector means, that at least partly transmits light of said wavelength $\lambda_1$ and that transmits substantially no light of said wavelength $\lambda_2$.

39. A system according to claim 38, further comprising a second radiation filter, positioned between said scanner pad and said second radiation detector means, that at least partly transmit light of said wavelength $\lambda_2$ and that transmits substantially no light of said wavelength $\lambda_1$.

40. A system according to claim 39, wherein at least one of said first filter and said second filter receives and diverts a beam of light from the incident light beam path if the light beam radiation in the light beam has a predetermined wavelength that is approximately one of said wavelength $\lambda_1$ or said wavelength $\lambda_2$.

41. A system according to claim 37, wherein said radiation source produces said light beam that substantially simultaneously has a wavelength component with said wavelength $\lambda_1$ and has a wavelength component with said wavelength $\lambda_2$.

42. A system according to claim 37, further comprising an optical filter, positioned between said radiation source and said radiation detector means, that is at least partly transparent to light at said wavelength $\lambda_1$ and to light at said wavelength $\lambda_2$ and that transmits substantially no light of a wavelength that is not approximately equal to $\lambda_1$ or to $\lambda_2$.

43. A pad according to claim 37, wherein said optical coating is positioned between said base layer and said radiation source.

44. A pad according to claim 37, wherein said base layer is positioned between said optical coating and said grid of lines.

45. A pad according to claim 37, wherein said base layer is positioned between said grid of lines and said radiation source.

* * * * *

UNITED STATES PATENT AND TRADEMARK OFFICE
CERTIFICATE OF CORRECTION

PATENT NO. : 5,015,070

DATED : May 14, 1991

INVENTOR(S) : James R. Montgomery et al.

It is certified that error appears in the above-identified patent and that said Letters Patent is hereby corrected as shown below:

Column 3, line 28, after "transparent" insert a comma;
    line 34, "on light" should read -- for light --;
    line 58, "(n=2.26-2.5)" should read -- (n = 2.26-2.52) --.

Column 5, line 41, after "wavelengths" delete ", respectively".

Column 6, line 16, "wave-length" should read -- wavelength --;
    line 17, after "filter" delete "means".

Claim 21, column 9, lines 28-30, "where the beam of light having a wavelength component $\lambda_2$ illuminates only a portion of the grid of lines;" should read -- and for sensing and storing in the memory means the text or graphics that are illuminated by the light beam; and --;
    line 31, "first radiation detector means" should read -- second radiation detector means --.

Signed and Sealed this

Second Day of March, 1993

Attest:

STEPHEN G. KUNIN

*Attesting Officer*    *Acting Commissioner of Patents and Trademarks*